US007981220B2

(12) United States Patent
Farion

(10) Patent No.: US 7,981,220 B2
(45) Date of Patent: Jul. 19, 2011

(54) SPLIT-CANE APPARATUS AND METHOD OF USE

(76) Inventor: Walter Eugene Farion, Calgary (CA)

( * ) Notice: Subject to any disclaimer, the term of this patent is extended or adjusted under 35 U.S.C. 154(b) by 850 days.

(21) Appl. No.: 12/009,856

(22) Filed: Jan. 21, 2008

(65) Prior Publication Data

US 2009/0183732 A1 Jul. 23, 2009

(51) Int. Cl.
*B01J 2/00* (2006.01)
*C13B 5/02* (2011.01)
*C13B 10/06* (2011.01)
*D01B 1/10* (2006.01)

(52) U.S. Cl. ................ 127/43; 127/2; 198/624; 241/79; 241/222

(58) Field of Classification Search ................ 127/2, 43; 198/624; 241/79, 222
See application file for complete search history.

(56) References Cited

U.S. PATENT DOCUMENTS 3,464,877 A 9/1969 Miller et al.
3,464,881 A 9/1969 Miller et al.
3,567,510 A 3/1971 Tilby
3,698,459 A 10/1972 Tilby
3,796,809 A 3/1974 Miller et al.
3,976,498 A * 8/1976 Tilby et al. ........................ 127/2
4,025,278 A 5/1977 Tilby
4,231,136 A 11/1980 Villavicencio
4,636,263 A 1/1987 Cundiff
4,961,952 A 10/1990 O'Sullivan
5,106,645 A 4/1992 Andrews
5,116,422 A 5/1992 Tilby
5,374,316 A 12/1994 Tilby
* cited by examiner

*Primary Examiner* — David A Reifsnyder
(74) *Attorney, Agent, or Firm* — Gene Scott; Patent Law & Venture Group

(57) ABSTRACT

A compact, self-contained, energy-efficient split-cane apparatus and method of use for separating pith, rind, and epidermis components of a sugarcane stalk, wherein sugarcane billets are driven over a splitter blade, dividing them longitudinally into two billet portions. The billet portions are processed individually by symmetrical processing paths. The pith is milled away from the rind while simultaneously flattening the rind. A deflector is adapted and positioned for directing the pith along a pith processing path, and further directing the rind along a rind processing path. The epidermis is removed from the rind, and each are subsequently shredded by at least one shredder disc, at which point an at least one perforated tumbling drum separates the shredded epidermis from the shredded rind. In addition, the apparatus is adjustable, enabling it to accommodate a wide range of sugarcane stalk thicknesses while maintaining its ability to efficiently separate each sugarcane component.

11 Claims, 2 Drawing Sheets

SPLIT-CANE APPARATUS AND METHOD OF USE

BACKGROUND OF THE INVENTION

1. Field of the Present Disclosure

This disclosure relates generally to a method and apparatus for preparing sugarcane stalks for subsequent, and more particularly to such methods and apparatus uniquely adapted to separate the pith, rind, and epidermis components of sugarcane stalk in a relatively efficient manner.

2. Description of Related Art Including Information Disclosed Under 37 CFR 1.97 and 1.98

Miller et al, U.S. Pat. No. 3,464,877, discloses a process for treating sugarcane to obtain utilized strips of laterally interconnected fibers of sugarcane rind by removing the pith from one side of the rind and the epidermis material from the other side of the rind without disturbing the rind fibers. The rind fiber strips are subjected to forming pressure and utilized in a desired configuration.

Miller et al, U.S. Pat. No. 3,464,881, discloses a structural building product manufactured from substantially uncrushed and pith-free sugarcane rind fiber bundles, said product formed by applying heat and pressure to the fiber bundles to bond and shape the bundles.

Tilby, U.S. Pat. No. 3,567,510, discloses a method and apparatus for separating the pith, rind, and epidermis components of split sugarcane stalk. Each split stalk portion is flattened and milled on the pith side to separate pith from rind and milled on an opposite side to remove epidermis. While the milling away of pith and epidermis is being effected, the rind is maintained in a flattened condition and is positively engaged by rind, velocity-controlling, gripping means which partially penetrate the ring periphery. The rind milling apparatus is characterized by a milling roll having a plurality of generally radially extending milling ridges. Each milling ridge has a planar milling side parallel to radial plan of the roll and a peripheral, arcuate, rind-contacting which intersects the planar milling side. The separator apparatus is incorporated with component conveying and handling systems to facilitate the modular stacking of separator units. This modulator stacking increases plant capacity and facilitates a secondary separation of residual pith from rind, after the primary rind and pith separation has taken place.

Tilby, U.S. Pat. No. 3,698,459, discloses a method for preparing a mass of randomly oriented, slender cane stalks for subsequent processing at a selected location. The method is intended to deliver the stalks in cleaned condition, chopped into uniform, relatively shorter lengths and aligned longitudinally in their direction of motion.

Miller et al, U.S. Pat. No. 3,796,809, discloses a process for sustaining livestock which involves providing the livestock with a feed comprising sugarcane pith which contains substantially all of its naturally present sugar juice and the fine inner fibers of the sugarcane stalk interior, but which is substantially free from the highly lignified outer rind fibers of the sugarcane. The sugarcane pith may be obtained by longitudinally opening the sugarcane without expressing a significant amount of the sugar juice from the pith, and then separating the pith from the outer rind fibers while retaining substantially all of the sugar juice in the pith.

Tilby, U.S. Pat. No. 4,025,278, discloses an apparatus for fabricating boards from sugarcane rind fibers wherein a board is formed by accumulating a mass of sugarcane rind fibers in a collection zone ahead of a horizontally reciprocable first-stage plunger that has a sweep face. The first-stage plunger is shifted horizontally toward a fiber compression zone to horizontally compact the sugarcane rind fibers and orient the fibers in vertical planes disposed substantially parallel to the sweep face. A second-stage plunger is shifted vertically downwardly from above the compression zone to push the horizontally compacted sugarcane rind fibers downwardly into a generally vertical passage means while vertically compressing the fibers. Consequently, the fibers are oriented in substantially horizontal planes to define a board segment comprised of sugarcane rind fibers having their axes disposed substantially parallel to the longitudinal axis of the board segment. The steps of accumulating, horizontally shifting, and vertically shifting are repeated to establish a column of abutting board segments in the extrusion passage. The board segments are heated at a heating station to melt natural resinous binder substances of the sugarcane rind fibers. Subsequently, the board segments are cooled at a setting station location below said heating station to re-harden the natural resinous binder substances and bind together the board segments into a unitary board structure.

Villavicencio, U.S. Pat. No. 4,231,136, discloses a bagasse depithing method wherein the pith removal from bagasse fiber is significantly enhanced by the flow of fiber directly from one depithing zone to a second depithing zone without any intermediate settling or pilings of the fiber. The fiber is maintained in a separated condition during the flow from one depithing zone to another depithing zone. The result is a bagasse fiber having a greater quantity of the pith removed with less fiber damage. It is also advantageous to provide a number of conveyors to transport fibrous material to a dual zone depithers and for the removal of depithed fiber and pitch from these depithers. This reduces fiber handling before, during and after depithing.

Cundiff, U.S. Pat. No. 4,636,263, discloses an apparatus and process for separating the pith from the bast of sweet sorghum. Cut and headed stalks of the plant are arranged as a mat of the required width on a conveyor and are forcibly advanced endwise into a rotating flail having a multiplicity of dull beating or striking elements which catch the advancing stalks against a stationary bar. The output of the process is a hail of small discrete particles of wet sugar-laden pith used in the production of fuel alcohol and elongated strings of fiber which had been the organized structural backbone of the plant. The quite differently sized and shaped products are separated by vibrating screens or elutriation in an air stream.

O'Sullivan, U.S. Pat. No. 4,961,952, discloses a process for the solid phase fractionation of sugarcane into three fractions comprising a fibrous fraction derived from the fibrous sclerenchyma cells from the rind of the cane, a fibrous fraction derived from the fibrous sclerenchyma cells of the fibrovascular bundles of the cane and a non-fibrous fraction derived from the parenchyma cells of the cane. The process comprises the steps of (a) subjecting pieces of the cane to a disintegrating force to cause a physical separation of the fibrous sclerenchyma cells from the non-fibrous parenchyma cells, (b) drying the sugarcane material, and (c) separating the sugarcane into the aforementioned three fractions.

Andrews, U.S. Pat. No. 5,106,645, discloses a flour-type product derived from sugarcane which contains a high dietary fiber concentration. This product is made by separating the pith of the sugar cane from the rind and epidermal layer and then removing from the pith any rind residue from a first stage separation and long fibrovascular bundles embedded in the parenchyma cells of the pith. The clean pith is dried and milled to shred the walls of the parenchyma cells into fiber having a length not exceeding 300 microns.

Tilby, U.S. Pat. No. 5,116,422, discloses sugarcane separation equipment having movable carriages adjacent to the tower-like central unit, such carriages being movable toward and away from such central unit and having dermax removal apparatus thereon. Secondary and tertiary carriages can be included on each side of the central unit to provide additional downstream functions or earlier diversion of the product streams, as desired.

Tilby, U.S. Pat. No. 5,374,316, discloses an apparatus and method for separating milled sugarcane pith from flattened rind upon discharge from a depithing station. The method includes dividing the discharge by a fixed deflector, preferably with a blunt upstream edge, into a primary pith flow and a rind flow which includes a secondary pith flow, and thereafter removing pith from the rind flow and diverting it to join pith from the primary pith flow. Preferred embodiments capture the pith in interstices of a rotating brush which merges with the secondary pith flow, turning such pith away from the rind flow, and then releasing it.

Miller et al, CA 789,214, discloses a process of segregating the rind of sugarcane stalks comprising removing material from the exterior of a stalk of sugarcane to expose the exterior fiber bundles of the rind, and removing from the interior fiber bundles substantially all of the pith of the stalk.

Tilby et al, CA 1,006,410, discloses a method of processing sugarcane stalk material comprising the steps of delivering sugarcane stalk material to a feed zone, resiliently gripping the sugarcane stalk material at the feed zone between a pair of circumferentially grooved resilient feed rolls having a plurality of tines projecting therefrom, rotating the resilient rolls so that the tines impale the stalk material and cause a feeding of the stalk material in response to frictional and tined engagement between the stalk material and the grooved rolls, and separating components of the stalk material.

The related art described above discloses apparatuses and methods for separating pith, rind, and epidermis components of a sugarcane stalk. However, the prior art fails to disclose such an apparatus that is adjustable to accommodate a wide range of stalk thicknesses while maintaining its ability to efficiently separate the sugarcane components. In addition, the prior art fails to disclose such an apparatus that is as compact, yet efficient, as the present invention. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The stalk of a sugarcane plant includes an outer rind which is a hard, wood-like fibrous substance. The rind surrounds a central core of pith, which bears nearly all of the sugar juice from which various sugar products are made. In addition, the outer surface of the rind has a thin, waxy epidermal layer, herein referred to simply as the epidermis.

It has been recognized in the sugarcane industry that a number of very useful products may be produced from sugarcane, other than simply sugar, if the sugarcane stalk is first separated into its rind, pith, and epidermis components. The many useful end-products made possible by such separation can provide great economic benefit. Such separation provides significant efficiencies in the production of sugar as well.

Currently, the common method to separate these components involves a system that includes a multi-step operation executed by various portions of a split-cane machine. Sugarcane billets, i.e., cut lengths of cane stalk preferably about 25-35 cm long, are driven downwardly over a splitter to divide them lengthwise into semi-cylindrical half billets. The two half billets of a split billet are then processed individually by symmetrical downstream portions of a split-cane machine. The first of such downstream portions of the separator is a depithing station which includes a cutting roll and holdback roll for milling pith away from the rind of the half billet while simultaneously flattening the rind. The next downstream portion is an epidermis removal station from which the rind emerges ready for subsequent processing in a variety of ways, including slitting, chipping, and/or many other processing steps. The pith is conveyed away from the split-cane machine to an extraction station where its sugar juice is removed.

The prior art discloses split-cane machines that require a plurality of pith-removing rolls in order to ensure that all of the pith is removed from the rind before further processing is performed on the rind. The present invention improves on this by providing a single set of pith-removing rolls and a deflector blade positioned to efficiently mill away the pith from the rind.

Each pair of opposing rolls is adjustable in order to modify the amount of space between the opposing rolls, enabling the present invention to accommodate and process a wide range of sugarcane stalk thicknesses while maintaining its ability to efficiently separate each one of the sugarcane components.

In addition, the present invention is much more compact than prior art split-cane machines, and is able to efficiently separate the pith, rind, and epidermis components while consuming significantly less power.

A primary objective inherent in the above described apparatus and method of use is to provide advantages not taught by the prior art.

Another objective is to provide a split-cane apparatus that is adjustable in order to accommodate a wide range of sugarcane stalk thicknesses while maintaining its ability to efficiently separate each one of the sugarcane components.

A further objective is to provide such an apparatus that is able to efficiently separate each one of the sugarcane components using a smaller number of rolls than the prior art.

A still further objective is to provide such an apparatus that is able to efficiently separate each one of the sugarcane components using significantly less power than the prior art.

A still further objective is to provide such an apparatus that is smaller and more compact than the prior art.

A still further objective is to provide such an apparatus that accomplishes the separation and processing of sugarcane stalk in a single, self-contained, compact unit.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWINGS

Illustrated in the accompanying drawings is at least one of the best mode embodiments of the present invention In such drawings.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
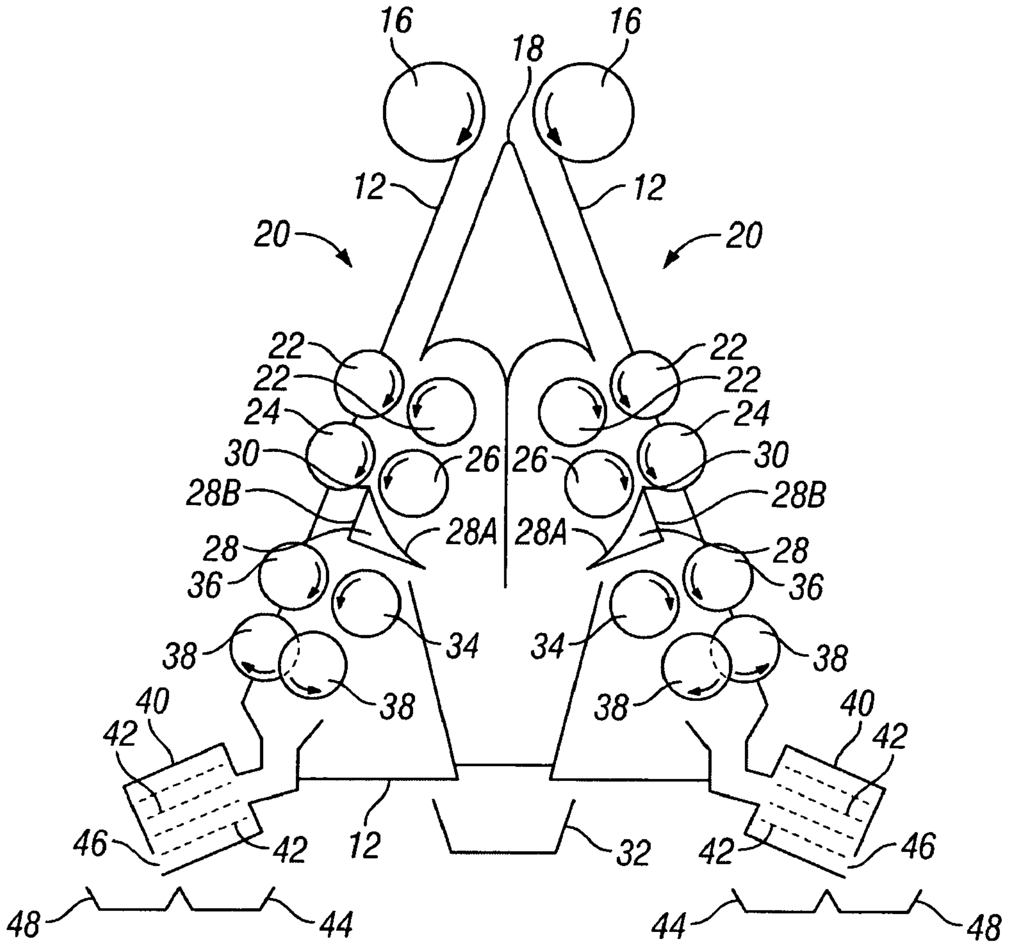
FIG. 1 is a mechanical schematic diagram of the presently described apparatus.
Figure 2:
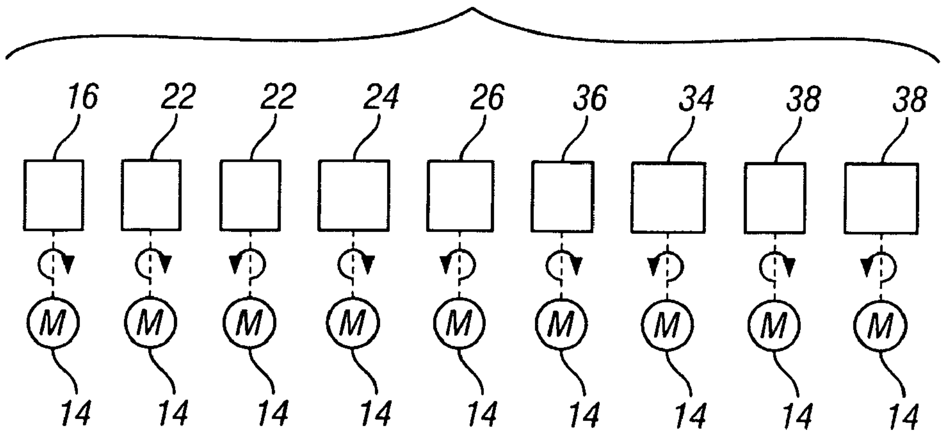
FIG. 2 is a schematic diagram of a drive thereof having a plurality of synchronized direct drive motors.
Figure 3:
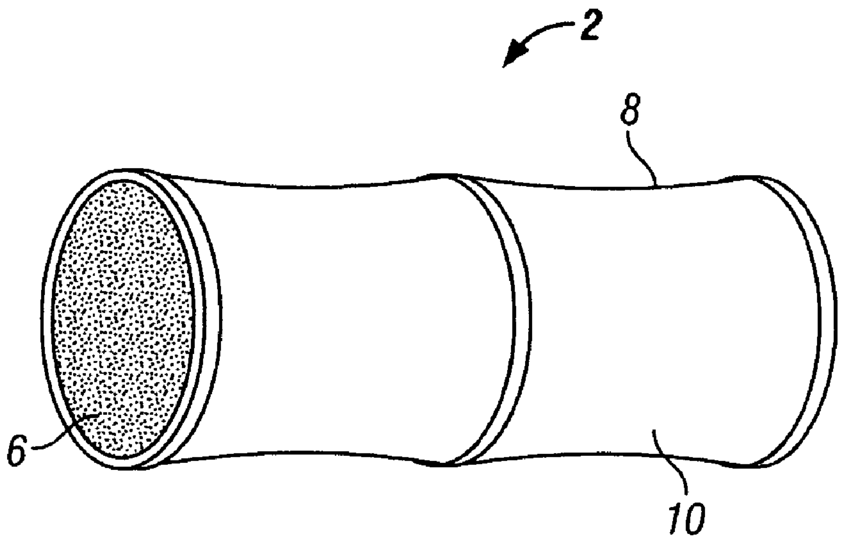
FIG. 3 is a perspective view of a sugarcane billet of a type processed in the described apparatus.

Described now in detail is a split-cane apparatus for separating pith 6, rind 8, and epidermis 10 components of a sugarcane stalk, as shown in detail in FIG. 3. As shown in FIG. 1, the apparatus comprises a frame 12 supporting and interconnecting a plurality of components. In addition, as shown in FIG. 2, a separate drive 14 is used for driving each one of the rotatable components. Preferably, each one of the rotatable components is driven by a direct drive variable speed electric motor. Driving the rotatable components in this way eliminates the need for gear boxes, belt drives, and chain drives which can potentially create many problems, given that sugarcane processing plants typically operate in areas having high levels of salt in the atmosphere. Thus, direct drives provide a more efficient and reliable means for driving the rotatable components. Clearly, the independent drive motors 14 are controlled by a controller (not shown) to provide the necessary speed synchronization and differential speed control. It should be noted that other means for driving the rotatable components may be substituted.

Figure 4:
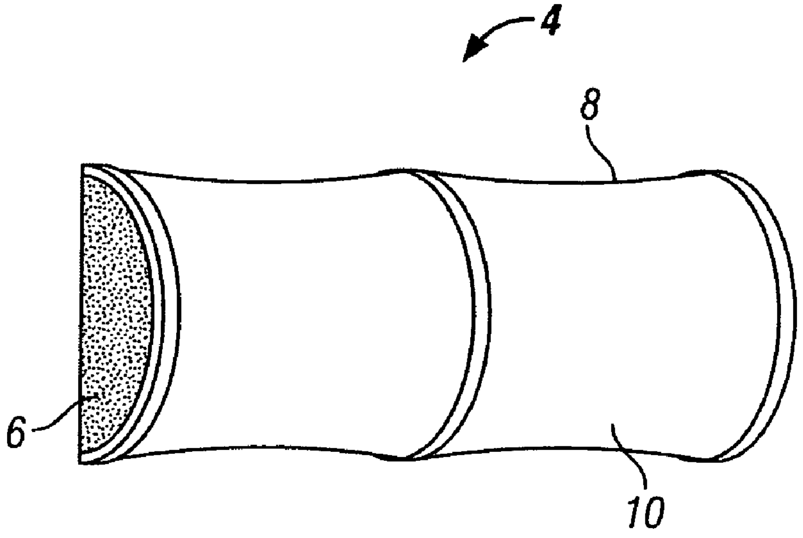
FIG. 4 is a perspective view thereof.

As shown in FIG. 1, a pair of first feed rolls 16 are positioned for frictionally engaging opposing sides of a pre-cut length of sugarcane stalk, herein referred to as a billet 2. The first feed rolls 16 are configured for guiding the billet 2 over a splitter blade 18 positioned for splitting the billet 2 longitudinally into two billet portions 4, as shown in FIG. 4. In the preferred embodiment, the splitter blade 18 has a cutting angle of 60 degrees. Preferably, the splitter blade 18 is vertically adjustable for accommodating billets of varying thicknesses. The two billet portions 4 are then processed individually by symmetrical processing paths 20. For each one of the two processing paths 18, a pair of second feed rolls 22 are positioned for frictionally engaging opposing sides of one of the billet portions 4 and directing it along the corresponding processing path 20. Preferably, each one of the first and second feed rolls 16 and 22 provide a gripping surface which enables the first and second feed rolls 16 and 22 to frictionally engage the billet 2 more effectively. The gripping surface is preferably concrete nails embedded into the first and second feed rolls 16 and 22 head first, such that a length of the tip of each one of the nails is exposed. However, other types of gripping surfaces may be substituted.

A first holdback roll 24 and a first cutting roll 26 are adjustably spaced apart and positioned for receiving the billet portion 4 from the second feed rolls 22. The first holdback roll 24 and first cutting roll 26 are adapted for removing the pith 6 from the rind 8 while simultaneously flattening the rind 8. Preferably, the first holdback roll 24 rotates at a slightly slower speed than the first cutting roll 26. In addition, the first holdback roll 24 provides both circumferentially positioned teeth as well as longitudinally positioned grooved teeth adapted for preventing acceleration of the billet portion 4 while the first cutting roll 26 is removing the pith 6. In one embodiment the first cutting roll 26 provides rows of 30 cutting teeth along the circumference of the first cutting roll 26, with an included angle of 12 degrees between each of the cutting teeth. In an alternate embodiment, the first cutting roll 26 provides rows of 36 cutting teeth along the circumference of the first cutting roll 26, with an included angle of 10 degrees between each of the cutting teeth. It should be noted that both the 30-tooth cutting roll and the 36-tooth cutting roll have the same diameter; thus, they can be used interchangeably in the present invention with no additional calibration. The prior art teaches similar teeth on both holdback rolls and cutter rolls, including the shape and material that such rolls may be comprised of. Please refer to Tilby, U.S. Pat. No. 5,374,316 which is hereby incorporated by reference into this disclosure.

The position of the first cutting roll 26 is fixed, while the position of the first holdback roll 24 is laterally adjustable for increasing or decreasing the space between the first cutting roll 26 and first holdback roll 24. This adjustability enables the present invention to accommodate billet portions 4 of various thicknesses.

A deflector 28 is positioned downstream from the first cutting roll 26. The deflector 28 provides a cutting edge 30 that is directed toward the first cutting roll 26 and positioned for removing pith remnants (i.e., any pith 6 that was not removed by the first cutting roll 26) from the rind 8. The deflector 28 is able to be adjusted slightly to increase or decrease the space between the cutting edge 30 and the first cutting roll 26, in order to accommodate billet portions 4 of varying thicknesses. As shown in FIG. 1, the deflector 28 further provides a pith side 28A and a rind side 28B. The pith side 28A is adapted and positioned for directing the removed pith 6 along a pith processing path. The pith processing path transports the pith 6 to a centralized pith receiver 32 positioned between the symmetrical processing paths 20, as shown in FIG. 1. The pith receiver 32 may be a large container, a conveyor belt, or any other means known to persons of ordinary skill to collect the pith 6 and prepare it for further processing. The rind side 28B is adapted and positioned for directing the flattened rind 8 along a rind processing path, discussed below.

A second holdback roll 34 and a second cutting roll 36 are adjustably spaced apart and positioned for receiving the flattened rind 8 from the rind side 28B of the deflector 28. The second holdback roll 34 and second cutting roll 36 are adapted for removing the epidermis 10 from the rind 8. Preferably, the second holdback roll 34 rotates at a slightly slower speed than the second cutting roll 36. In addition, the second holdback roll 34 provides both circumferentially positioned teeth as well as longitudinally positioned grooved teeth adapted for preventing acceleration of the billet portion 4 while the second cutting roll 36 is removing the epidermis 10. The second cutting roll 36 provides cutting teeth arrangements similar to that of the first cutting roll 26 described above.

The position of the second holdback roll 34 is fixed, while the position of the second cutting roll 36 is laterally adjustable for increasing or decreasing the space between the second holdback roll 34 and second cutting roll 36. This adjustability enables the present invention to accommodate billet portions 4 of various thicknesses.

As shown in FIG. 1, at least one shredder disc 38 is positioned for receiving the separated epidermis 10 and rind 8 from the second cutting roll 36. In the preferred embodiment, at least two knurled shredder discs 38 are positioned in a stacked overlapping fashion in order to efficiently shred both the epidermis 10 and rind 8.

As shown in FIG. 1, a perforated tumbling drum 40 is positioned for receiving both the shredded epidermis 10 and the shredded rind 8. A plurality of perforations 42 in the tumbling drum 40 are sized for separating the shredded epidermis 10 from the shredded rind 8 by allowing the shredded epidermis 10 to pass through the perforations 42 and into an epidermis receiver 44. In addition, the tumbling drum 40 is angled, allowing the shredded rind 8 to pass through an opening 46 in the tumbling drum 40 and into a rind receiver 48.

The present invention, as described above, is thus able to separate pith 6, rind 8, and epidermis 10 components of a sugarcane stalk. The method of doing so comprises the steps of: interconnecting and arranging the frame 12 and the plurality of direct drives 14 with a plurality of components along a processing path 20; forcing the billet 2 with the first feed rolls 16 over the splitter blade 18; removing the pith 6 from the rind 8, and flattening the rind 8 using the first holdback roll 24 and first cutting roll 26; removing pith remnants from the rind 8 and directing the pith 8 and pith remnants to the pith receiver 32; removing the epidermis 10 from the rind 8 using the second holdback roll 34 and second cutting roll 36; shredding the epidermis 10 and rind 8 using the at least one shredder disc 38; and separating the shredded epidermis 10 from the shredded rind 8 using a tumbling drum 40.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A split-cane apparatus for separating pith, rind, and epidermis components of a sugarcane billet, the apparatus comprising:

a frame with a drive, the drive interconnected with a plurality of components arranged along a processing path;

a pair of feed rolls operable in forcing the billet over a splitter blade;

a first holdback roll and a first cutting roll, operable in removing the pith from the rind, and in flattening the rind;

a deflector operable in removing pith remnants from the rind and directing the pith and pith remnants to a pith receiver;

a second holdback roll and a second cutting roll operable in removing the epidermis from the rind;

a shredder disc operable in shredding the epidermis and rind; and a tumbling drum operable in separating the shredded epidermis from the shredded rind.

2. The apparatus of claim 1 wherein the feed roll provides a gripping surface.

3. The apparatus of claim 1 wherein the holdback rolls provide circumferentially positioned teeth, and longitudinally positioned grooved teeth.

4. The apparatus of claim 1 wherein the respective associated holdback rolls and cutting rolls have a differential in rotational speed.

5. The apparatus of claim 1 wherein the cutting rolls have one of approximately 30 and 36 cutting teeth.

6. The apparatus of claim 1 wherein the splitter blade, the respective associated cutting rolls and holdback rolls, and the deflector are each operably positionable to accommodate billet size variations.

7. A split-cane method for separating pith, rind, and epidermis components of a sugarcane billet, the method comprising the steps of:

a) interconnecting and arranging a frame and a drive with a plurality of components along a processing path;

b) forcing the billet with a pair of feed rolls over a splitter blade;

c) removing the pith from the rind, and flattening the rind using a first holdback roll and a first cutting roll;

d) removing pith remnants from the rind and directing the pith and pith remnants to a pith receiver;

e) removing the epidermis from the rind using a second holdback roll and a second cutting roll;

f) shredding the epidermis and rind using a shredder disc; and g) separating the shredded epidermis from the shredded rind using a tumbling drum.

8. The method of claim 7 comprising the further step of engaging the billet with a gripping surface of the feed roll.

9. The method of claim 7 comprising the further step of gripping the billet with circumferentially positioned teeth, and longitudinally positioned grooved teeth of the holdback rolls.

10. The method of claim 7 comprising the further step of providing a differential in rotational speed between the respective associated holdback rolls and cutting rolls.

11. The method of claim 7 comprising the further step of positionally adjusting positions of the splitter blade, the respective associated cutting rolls and holdback rolls, and the deflector to accommodate billet size variations.

* * * * *